United States Patent Office.

JACOB HAMTON MORRIS, OF EATON, OHIO.

Letters Patent No. 99,583, dated February 8, 1870.

IMPROVED MEDICINE FOR CURE OF FEVER AND AGUE.

The Schedule referred to in these Letters Patent and making part of the same.

*To all whom it may concern:*

Be it known that I, JACOB HAMTON MORRIS, of the town of Eaton, in the county of Preble, in the State of Ohio, have invented a Medicine, consisting of ingredients, for the Cure of the Disease known as Fever and Ague; and I do hereby declare that the following is a full and exact description thereof.

I take one (1) ounce of sanguinaria, and one (1) drachm of sweet flag.

The process of combining is as follows:

Take the ingredients, as above stated, in a pulverized state, and mix them with one quart of pure whiskey.

What I claim as new, and desire to secure by Letters Patent, is—

The medicine, for the cure of fever and ague, composed of the within-named ingredients, substantially as described.

JACOB H. MORRIS.

Witnesses:
    ERWIN SEELEY,
    THEODORE H. MORRIS.